Nov. 2, 1937.  F. P. FAHY  2,097,947
METHOD OF AND APPARATUS FOR MAGNETIC TESTING
Filed Sept. 2, 1933
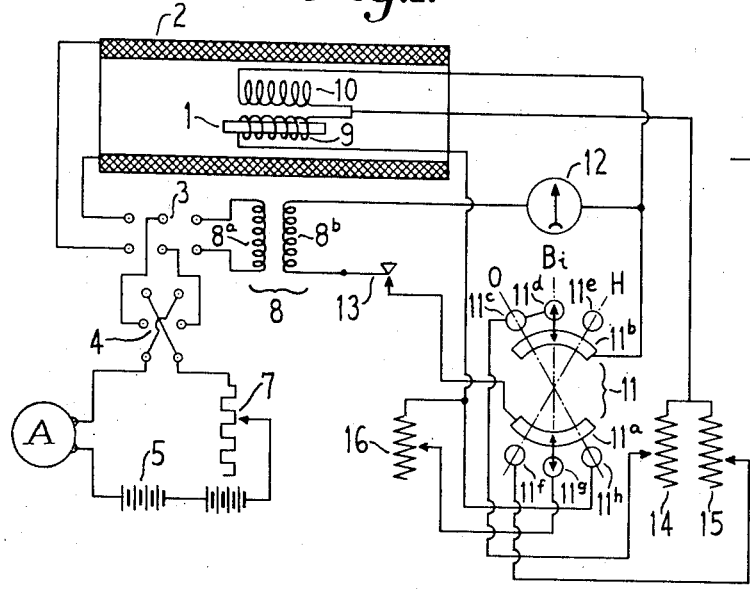
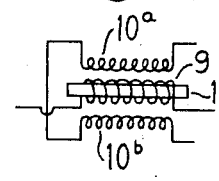
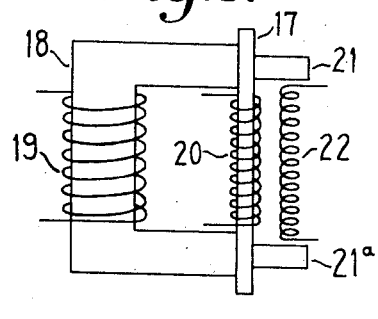
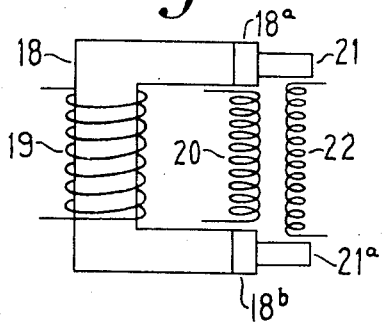
INVENTOR
Frank P. Fahy
BY Patented Nov. 2, 1937

2,097,947

UNITED STATES PATENT OFFICE 2,097,947

METHOD OF AND APPARATUS FOR MAGNETIC TESTING

Frank P. Fahy, New Rochelle, N. Y.

Application September 2, 1933, Serial No. 687,935

18 Claims. (Cl. 175—183)

This invention relates to a method of and apparatus for determining the properties of material as regards its magnetic characteristics.

The object of my invention is to provide a practical and effective method of and means for testing and evaluating the magnetic properties and characteristics of materials and more in particular for determining directly the intrinsic induction attained in such materials when they are subjected to the action of a magnetizing force.

A specific feature of the invention lies in its applicability to the testing of feebly magnetic materials, in that novel differential means are provided for balancing out such magnetic flux as is not significant of the magnetic quality of the material, thereby permitting direct measurement of the flux which is truly characteristic of the material.

Other advantages and objects of my invention will appear as the specification of my invention proceeds.

In the accompanying drawing:

Figure 1 is a diagrammatic representation of one form of apparatus which I may employ, having two test coils, in which a solenoid energized by an electric current comprises the magnetizing means.

Figure 2 is a diagrammatic representation of a modification of the apparatus of Figure 1, in which one of the two test coils is shown in two portions.

Figure 3 is a diagrammatic representation of another form of apparatus for carrying out my invention, in which a magnetized yoke is employed as a source of magnetomotive force.

Fig. 4 is a diagrammatic representation of the apparatus of Fig. 3, showing the polar extensions used in connection with such apparatus in the source of its preliminary adjustment.

Referring to Fig. 1, a specimen of material 1, the magnetic properties of which are to be tested, is shown located at the central interior region of a solenoid exciting winding 2, illustrated in longitudinal section, which is arranged for connection through one side of a double-pole, double-throw switch 3 and a reversing switch 4 to a source of current 5, ammeter 6 and adjustable rheostat 7 being provided for observation and regulation of the exciting current, respectively. The remaining side of switch 3 is bridged by the primary winding 8ª of a mutual inductance 8.

Located at the center of length of the winding 2 and disposed for encircling a specimen 1 is a test or secondary coil 9 and in fixed parallel relation to and adjacent to such winding 9 is a second coil 10 of equal length, the area-turns of which (mean area of winding×number of turns) is in excess of the area-turns of the winding 9. The coils 9 and 10 are connected in series in such manner that the electromotive forces induced therein are in opposition, upon the application or change of magnetizing current in the winding 2. As shown in Fig. 1, one terminal of the test coil 10 is connected to central sector 11ª of a double-pole, triple-throw, dial type switch designated as a whole by 11, through a ballistic galvanometer or other indicating instrument 12, the secondary winding 8ᵇ of the inductance 8 and a key 13, and also directly to central sector 11ᵇ of the switch 11. From the series jumper of coils 9 and 10 a connection is made, as shown, to a common terminal of two adjustable resistances 14 and 15, the other terminals of which are connected respectively to contact points 11ᶜ and 11ᶠ of switch 11. The remaining terminal of coil 9 is connected directly to contact point 11ʰ of switch 11 and also, through an adjustable resistance 16, to contact point 11ᵍ of switch 11. As will be noted, contact points 11ᶜ and 11ᵈ of switch 11 are inter-connected, while contact point 11ᵉ is unconnected. The three possible positions of the switch 11 are designated as O, B₁ and H and will be referred to as such below, in the description of the operation of the apparatus of Fig. 1.

As regards the apparatus of Fig. 1, it is required to know in advance the number of turns in the test coil 9 and the area-turns of the test coil 10. The number of turns in the coil 9 is best determined by actual count at the time of construction of this coil, while the area-turns of the winding 10 are preferably determined through direct measurement in the magnetizing field provided by a long solenoid, under a test procedure well-known to any one skilled in the art. As a further preliminary to the use of the apparatus of Fig. 1 in the course of determining the magnetic characteristics of a specimen of material, it is required to so balance or equalize the effect of the differentially connected test coils 9 and 10 that with no specimen inserted within coil 9, the electromotive forces acting upon the galvanometer 12 will be zero for any values of magnetizing force applied by means of the exciting winding 2. The desirability of this will be clear from the following:

Let us assume that the apparatus of Fig. 1 is to be used for the purpose of determining the intrinsic induction of a specimen of material which is feebly magnetic in character, or having a permeability of, say, 1.02, under an applied magnetizing force of 200 oersteds. If such a specimen has unit cross-section, then the number of lines of force which would permeate it would be 204, of which 200 lines are a function of the applied magnetizing force and 4 lines only characteristic of the material itself, corresponding to its intrinsic induction, according to the relation:

$$\text{Permeability} = \frac{B}{H} = \frac{H+B_i}{H} = \frac{200+4}{200} = 1.02 \quad (1)$$

where B is the normal induction, H the magnetizing force and $B_i$ the intrinsic induction. Obviously, the electromotive force which would be developed through a single coil 9, under a changing magnetomotive force, is a function not only of the number of turns in such coil and the permeability of the material which it embraces, but also of the mean cross-sectional area of the coil winding. That is, the coil 9 links a total flux which is compounded of the intrinsic flux and an extraneous or spatial flux represented by the product of the mean area of the coil 9 and the magnetizing force. It is therefore desirable, since the intrinsic induction is directly characteristic of the material under test, and hence is the significant quantity, that a galvanometer such as 12 be actuated by an electromotive force representing the intrinsic flux alone, as this permits of the use of such an instrument at the maximum desirable sensitivity. A procedure permitting such precise measurement calls for balancing out the extraneous flux lines arising directly from and due solely to the magnetizing force, so that, for example, when no specimen of test material is within coil 9, or a specimen of non-magnetic material (intrinsic induction=0) is within such coil, the galvanometer will have no electromotive force exerted upon it when the current in the exciting winding 2 is applied or changed in any manner.

According to my invention the desired balancing out of such flux lines is accomplished as follows: with no specimen within the coil 9, switches 3 and 4 are closed in such manner that current from the source 5 passes through the exciting winding 2. This current is preferably adjusted by means of rheostat 7, through observation of ammeter 6, until a reasonably high value of magnetizing force, say, 150 oersteds, is attained as may be estimated from the relation:

$$H = 0.4\pi NI \quad (2)$$

where H is the magnetizing force, N, the number of turns per unit length of the exciting winding 2 and I the exciting current. The dial switch 11 is then placed in the position corresponding to 0,—balancing position. As will be seen from the electrical connections shown in Fig. 1, in this position of the dial switch the galvanometer 12 is directly connected to the differentially connected coils 9 and 10 through the mutual inductance secondary $8^b$ and key 13, while at the same time coil 10 is shunted by the adjustable resistance 14. As pointed out above, the area-turns value of the coil 10 is purposely made greater than the area-turns value of the coil 9. If now successive reversals be made of the switch 4, with key 13 depressed so as to close the galvanometer circuit, adjustment can be made of the resistance 14 so that the galvanometer 12 finally shows no deflection. Under such conditions, the electromotive force arising from the coil 9 is exactly balanced by the electromotive force arising across the terminals of the resistance 14, such resistance acting to equalize the induced electromotive force characteristics of the coils 9 and 10. The situation then obtains that the area-turns of the coils 9 and 10 are in effect made equal for all values of magnetizing force applied by means of the exciting winding 2.

In further preparing the apparatus of Fig. 1 for the testing of specimens of material, it is necessary that the galvanometer 12 be calibrated so that the graduations of its scale represent some multiple of units for the measurement of intrinsic induction and magnetizing force, respectively. As a means to this end the mutual inductance 8 is provided, the secondary winding $8^b$ of which is in the galvanometer circuit for all positions of switch 11. In calibrating the galvanometer 12, switch 3 is closed in such manner that current from the source 5 is allowed to flow in the primary $8^a$ of the inductance 8. Proceeding first with calibration for the measurement of intrinsic induction, switch 11 is placed in the position $B_i$ wherein the electrical connections of the galvanometer circuit are equivalent to those corresponding to the position O except that adjustable resistance 16 is interposed in series relation in order to permit of the galvanometer control. A current of computed value is then reversed in the primary of the inductance 8 as will induce an electromotive force in the galvanometer circuit of equal value to that which would be induced by the reversal of a definite differential number of lines of force within the coils 9 and 10, resulting from a test specimen of given cross-sectional area. The formula employed in calculating the current to be thus reversed is as follows:

$$I = \frac{B_i NA}{M 10^8} \quad (3)$$

where
 I = current in amperes to be reversed
 $B_i$ = intrinsic flux lines per unit section (intrinsic induction) of test specimen
 N = number of turns in coil 9
 A = cross-sectional area of test specimen
 M = value of mutual inductance in henrys For example, let 10 scale divisions of the galvanometer 12 represent an intrinsic induction of 10. Then, if N = 2000, A = 2.0 sq. cm., and M = 0.010 henry, I = 0.04 ampere Switch 11 being on the position $B_i$, as indicated, rheostat 7 is adjusted until ammeter 6 registers 0.04 ampere. Then key 13 is closed and switch 4 manipulated in successive reversals until through adjustment of the resistance 16 the ballistic throw of galvanometer 12 is exactly 10 divisions for any one reversal. Thereupon the galvanometer is calibrated to measure intrinsic induction wherein each division of throw, to be observed in the subsequent test of the specimen, is equal to 1 line of force per unit cross-sectional area of such specimen, or an intrinsic induction of 1.

To calibrate the galvanometer 12 for the purpose of measuring magnetizing force, switch 11 is placed in the position H wherein the galvanometer is connected directly to the coil 10 through the inductance secondary $8^b$, key 13 and adjustable resistance 15. For this position of switch 11 it will be noted that the adjustable resistance 14 does not bridge coil 10 as is the case for positions O and $B_i$. It is to be pointed out that the air flux per unit section at the interior region of the exciting winding 2, adjacent to any test material inserted therein, is equal to and therefore provides a measure of the magnetizing force. In adjusting the galvanometer 12 for the direct measurement of magnetizing force according to this principle, an equation analagous to (3) above is employed for the purpose of determining the current to be reversed in the inductance primary $8^a$, or:

$$I = \frac{HNA}{M10^8} \quad (4)$$

where:

$I$ = current in amperes to be reversed
    $H$ = flux per unit section of winding 10 (magnetizing force)
    $NA$ = area-turns of winding 10
    $M$ = value of mutual inductance in henrys For example, let a galvanometer throw amounting to 10 scale divisions represent a magnetizing force of 200 oersteds. Then, if $NA = 10,000$ and $M = 0.010$ henry, $I = 2.00$ amperes. Switch 11 being on the position H, as indicated, rheostat 7 is accordingly adjusted until ammeter 6 registers 2.00 amperes. Thereupon key 13 is closed and switch 4 reversed successively until through adjustment of resistance 15 the ballistic throw of galvanometer 12 is exactly 10 divisions for any one reversal. The galvanometer is then calibrated to measure magnetizing force wherein each division of throw, to be observed in the subsequent test of the specimen, is equal to 20 oersteds.

The complete calibration having been effected, switch 3 is closed so as to change the current circuit connections from the inductance primary $8^a$ to the exciting winding 2 and the test specimen placed within coil 9. It will then be clear that with switch 11 placed in sequence on the positions $B_1$ and H, successive reversals of switch 4 will cause galvanometer deflections from which the intrinsic induction and magnetizing force corresponding thereto may be observed over a series of magnetizing force values for the given specimen. Similarly, for any changes in value of the exciting current flowing in winding 2, whether or not these entail changes in the direction of flow of said current, galvanometer deflections will ensue from which the changes in intrinsic induction and magnetizing force may be determined.

It may here be pointed out that it is desirable, between the testing of individual specimens of material, to observe from time to time whether or not the true balance of the coils 9 and 10 is maintained. This balance may alter slightly due to unequal heating effects on such coils, arising from the exciting current in the winding 2. Any disturbance of balance may be corrected through further adjustment of the resistance 14, when no test specimen is within coil 9.

It is not essential to the operation of the apparatus of Fig. 1 that the test coil 10 be in the form of a single coil and in Fig. 2 I illustrate the test material 1 as encircled by a single coil 9 with a coil 10 comprised in two portions, designated as $10^a$ and $10^b$, respectively, and connected in series assisting. In the operation of the apparatus of Fig. 1 employing the alternative coil system of Fig. 2, the series combination of coils $10^a$ and $10^b$ is arranged to have an area-turns value greater than the area-turns value of coil 9 and such combination is connected to the galvanometer in series opposition to the coil 9 when switch 11 is on the points O and $B_1$, while the series combination $10^a$ and $10^b$ is alone connected to the galvanometer 12 for the H position of such switch. The especial advantage of the coil arrangement shown in Fig. 2 is that the turns of the coils $10^a$ and $10^b$ are thereby brought into closer space relation to a test specimen 1 than would obtain in the use of a single coil 10 of equivalent area-turns value.

A distinctive feature of my invention is comprised in the construction as shown in Figs. 1 and 2, wherein the magnetizing force measurement and extraneous flux deduction elements form an integral part of the induced electromotive force system. To further point out the novel features and advantages of such invention, reference is made to the prior art of making measurements of the order described.

Methods of balancing out the electromotive force effects of the extraneous flux, or that flux corresponding to the magnetizing force and hence not in itself indicative of the magnetic quality of the test material, have been employed in the past, of which the two most significant may be cited. One of these, in addition to such a coil as 9, provides a differentially connected companion test coil analagous to coil 10 of Fig. 1, but which has previously been adjusted by trial and error so that its area-turns value is exactly equal to that of the coil 9, whereupon the induced electromotive force balance out for the case where there is no specimen within the coil 9. This construction has the great disadvantage that while such coils may initially be made equal as to area-turns, they cannot be expected to maintain equality for any reasonable length of time particularly when they are subjected to such cycles of heating and cooling as arise from the exciting current. While no instance is at present known to me of such a companion coil being alternately and singly used for the measurement of the magnetizing force acting on the test specimen, even if this were the case the method would have a serious lack of flexibility. This, for the reason that the companion coil is limited in permissible area-turns to the area-turns value of the coil encircling the specimen and for many purposes such area-turns value would not be sufficiently large to provide for the proper degree of sensitivity in the measurement of magnetizing force.

Another method of accomplishing the balancing out of the extraneous flux effects consists in locating the primary winding of a variable mutual inductance in series relation with the exciting winding 2, Fig. 1, and connecting the secondary of such inductance in series opposition to a single test coil such as 9, through the galvanometer 12. With no specimen in coil 9, as the exciting current is reversed the variable mutual inductance is adjusted until the electromotive forces induced respectively in such inductance secondary and the test coil 9 are balanced, as shown by zero deflection of the galvanometer 12. This latter method has the disadvantage of requiring a variable mutual inductance of very considerable range, as well as another disadvantage inherent also in the prior method first mentioned above. That is, no provision is made for adequate and accurate means for measuring the true magnetizing force acting on the specimen under test. In the application of both of these prior methods it is the custom to consider the true magnetizing force as equal to the magnetizing force computed through Equation (1) above, i. e., as a function of the current turns of the exciting winding. But this does not provide for accuracy in magnetizing force measurement in the case where the test specimen is short in length and at the same time relatively large in section, as is frequently mandatory for economical and other reasons. In such case the true magnetizing force is less than the applied magnetizing force to a degree which depends upon the permeability of the test specimen, because of the self-demagnetizing action of the latter. It will therefore be clear that there can be no linear relation under all circumstances between the exciting current and the magnetizing force and in the case where a variable mutual inductance is employed for balancing purposes, such inductance must be set anew for every value of exciting current if accurate measurements are desired.

It will be clear that the apparatus of Fig. 1 discloses a differential permeameter in which two test coils are acted upon by the same applied magnetomotive force, imposed by means of a solenoid, these coils being inter-connected so that the induced electromotive force arising from one is opposed by the electromotive force drop in a shunt located across the terminals of the second coil, the resultant electromotive force being taken as a measure of the relative flux characteristics of the mediums embraced by the two such coils. In the description of such apparatus it has been assumed that the test specimen 1 is of feebly magnetic material, i. e., one having a permeability comparable to that of air or of a vacuum. The utility of my invention is not limited, however, by considerations of permeability magnitude and such apparatus as disclosed in Figs. 1 and 2 is equally well fitted for the testing of materials of high permeability, such as form the cores of electro-magnetic and other like devices. Nor do I limit myself to the specific means for producing an exciting field shown in Fig. 1. In Figs. 3 and 4 I illustrate a modification of the apparatus of my invention in which the material under test is subjected to the direct magnetization effects of a yoke formed of magnetic material which is energized by means of an exciting winding. Referring to Fig. 3, a test specimen 17 is shown as spanning the pole faces of a U-shaped yoke of magnetic material 18 which bears an exciting winding 19 which may be connected to a source of electromotive force, with circuit connections thereto, exactly as shown in Fig. 1 in the case of exciting winding 2. Encircling the test specimen 17, between the pole faces, is a coil 20 which has a fixed relation to the gap formed by the arms of the yoke 18. Pole pieces 21 and 21ᵃ of magnetic material are each arranged for magnetic contact at one end with the respective end regions of the specimen 17, as shown, and are spanned by a coil 22 which is rigidly supported by such pole pieces at their outer end portions. The apparatus illustrated diagrammatically in Fig. 3 represents the construction of a permeameter disclosed and claimed in U. S. Patent No. 1,511,595 granted to me and is shown herein as a desirable means, in part, for utilizing the full advantages of the invention disclosed in this application. The secondary or test coil connections shown in Fig. 3 of such patent are disposed for the purpose of measuring the total induction and magnetizing force of a test specimen through the separate and distinct intervention of coils T and H respectively, instead of intrinsic induction and magnetizing force which my experiments have now shown me as entirely feasible when the proper procedure for initially balancing such coils is carried out. The coils corresponding to T and H of Fig. 3 of U. S. Patent No. 1,511,595 are designated as 20 and 22, respectively, in Figs. 3 and 4 of this application.

Referring to Fig. 3, the coil 20 is analogous to and performs an equivalent function to that of coil 9 of Fig. 1, while the coil 22 is equally analogous to and performs the equivalent function of coil 10 of Fig. 1. These coils 20 and 22 may therefore be so differentially connected, with the coil 22 shunted by a resistance, as to measure the intrinsic induction of a specimen such as 17 over a sequence of excitation values of the winding 19. Correspondingly, the coil 22, as unshunted, may be used to measure the related magnetizing forces. Preliminary to the use of the apparatus illustrated in Fig. 3 for determining intrinsic induction, the balance of the differentially connected coils 20 and 22 should be carried out under such conditions that coil 20, with no test specimen inserted therein, will yet have its ends bearing upon magnetic material in contact with the yoke, as is the case with coil 22, where the ends of such coil bear upon the pole pieces 21 and 21ᵃ. This is accomplished as shown in Fig. 4 wherein yoke extensions of magnetic material, 18ᵃ and 18ᵇ, each of section equivalent to that of the yoke arms, are fitted to the pole faces of yoke 18. These yoke extensions are preferably so dimensioned as to thickness that their opposed ends as presented to coil 20 have each an area equivalent to the cross-sectional area of such coil 20. The pole pieces 21 and 21ᵃ are then brought into contact with the outer faces of the yoke extensions 18ᵃ and 18ᵇ. It will be seen that under such an arrangement both of the coils 20 and 22 span magnetic bodies which form prolongations of the yoke 18.

The further operations for carrying out the initial balancing of the test coils 20 and 22 now proceeds exactly as described in the case of the balancing of the coils 9 and 10 of Fig. 1, since it will be understood that yoke 18 with winding 19 and the test coils 20 and 22 of Fig. 3 are wholly interchangeable with the solenoid and test coils of Fig. 1, with respect to the wiring arrangement shown diagrammatically in detail in such figure. Accordingly, the yoke winding 19 is energized from the source 5 and switch 11 is placed on the contact position O, while resistance 14 is adjusted until there is no deflection of the galvanometer 12 as switch 4 is reversed. The balance accomplished, switch 3 is closed so as to energize the primary winding 8ᵃ of the inductance and the galvanometer calibration carried out exactly as described for the apparatus of Fig. 1, in which the number of turns of coil 20 and the area-turns value of coil 22 as also the cross-sectional area of test specimens 17 are substituted in Equations (3) and (4) above. It will be realized that when the specimen 17 is of highly permeable material, the adjusted value of each unit of galvanometer deflection should be suited to the special conditions of flux and magnetizing force value which are to be met. Following the completion of the calibration, the extensions 18ᵃ and 18ᵇ are removed from the pole faces of yoke 18 and the specimen 17 inserted within coil 20 so as to span the yoke pole faces as shown in Fig. 3, pole pieces 21 and 21ᵃ being brought into contact with the outer end regions of the test specimen on the side away from the yoke. In the special case where the specimen 17 is not rectangular in section and it is necessary to employ bushings to provide for adequate magnetic contact between it and the yoke faces, the pole pieces 21 and 21ᵃ are brought into contact with some outer flat portion of such bushings.

A very great practical advantage accrues to the application of my invention to the apparatus of Fig. 3, as also is the case in its application to the apparatus of Fig. 1. Referring here specifically to the apparatus of Fig. 3, the winding 20 may be of such sectional dimensions as to permit the receiving of test specimens of widely varying section, provided that the area-turns of coil 22 are always in excess of the area-turns of coil 20. Since the coils 20 and 22 are balanced prior to the actual test of specimens of material so that flux interlinkage equivalent to magnetizing force does not appear as an electromotive force, there is no so-called "air correction", common to permeameters, to be applied to the induction as observed from the galvanometer deflection. This air correction comes about as the result of the difference between the mean cross-sectional area of the test coil 20 and the cross-section of the specimen which it encircles. Since the observed induction according to my invention is the intrinsic induction, the normal induction from which the permeability of the test material is calculated is then this intrinsic induction plus the value of the magnetizing force, as is indicated in Equation (1).

While I have specifically mentioned a ballistic galvanometer as employed as an indicating instrument in the use of the apparatus of my invention, it will be understood that I do not intend to limit myself to this type of flux indicating instrument. Likewise, I do not intend to limit myself to the use of direct current for excitation purposes as might apparently be indicated from the battery 5 shown diagrammatically in Fig. 1. Where direct current is used for excitation and a ballistic galvanometer is employed as an indicating instrument, it is obvious that the induced electromotive forces are of the nature of integrated electromotive forces corresponding to a single change in flux conditions. I may, however, employ alternating or otherwise varying current as a means of producing a changing magnetic field in which event any indicating instrument suitable for measuring or indicating effective electromotive forces may be used. While a specific feature of my invention is its applicability to the magnetic testing of materials under conditions where the results may be stated in formally recognized units, as permeability, intrinsic induction, etc., the apparatus of such invention may also be employed in empirical testing of magnetic characteristics under a procedure wherein the test results have no relation to established magnetic quantities. In the use of alternating or otherwise continuously varying current as a means of excitation it is not always possible by reason of "skin effect" to obtain flux penetration to the degree which permits statement of the test results in orthodox units, yet such results used in the comparison of specimens often are highly significant in magnetic analysis wherein magnetic flux properties under a given set of conditions are used as a means of estimating other physical properties.

The instruments described herein are capable of use for many different purposes. They may be used for determining the permeability, residual induction coercive force and saturation of magnetic materials. The apparatus of Figs. 1 and 2 are especially useful for determining the magnetic properties of austenitic material such as the nickel-chromium or so-called corrosion-resisting steels, as well as non-ferrous metals in general. They are also useful in testing the magnetic properties of materials where such properties indicate the presence of impurities, as asbestos, coal, sand, mica, glass, etc. For such testing, as also in the testing of iron or other ores, it is sometimes desirable to shape the material in a non-magnetic container of definite dimensions, for insertion in the test winding.

While I have described the apparatus of Figs. 1, 2, 3, and 4 as employed in the testing of relatively short lengths of material, these are equally useful for the testing of consecutive portions of elongated bodies. This may be accomplished under a step-by-step program in which successive elements of length of a bar, rod, cable, wire, rail, etc., may be made to register within the coils 9 and 20, respectively, such length elements being subjected to individual testing. The apparatus of Fig. 1 is particularly well adapted for the rapid testing of elongated bodies for uniformity or homogeneity in magnetic properties under a procedure in which the body is fed through the test coil 9 at any suitable rate of speed, or the coils 9 and 10, with the exciting winding 2, may be moved relatively to the body. It will be apparent that in this use of such apparatus a constant current may be employed for excitation of the winding 2, since variations in magnetic characteristics of such bodies from point to point will in themselves cause variations in magnetic linkage and therefore variations in the induced electromotive forces acting upon the indicating instrument. In addition to this use of my invention it may also be employed for comparing an unknown specimen of material with a standard of known magnetic properties. For example, with reference to the apparatus of Fig. 1, I may place in each of coils 9 and 10 standard specimens of material of like magnetic properties, subject them to the action of the exciting field and balance the induced electromotive forces by means of resistance 14. Thereupon one of the standard specimens is removed from its test coil and successive unknown specimens inserted within such coil, being subjected in turn to the action of the apparatus and classified on the bases of the flux variations relative to the standard, as determined from the galvanometer deflections. Or, again, instead of exactly balancing the galvanometer for the two standard specimens, as described, I may adjust the shunting resistance 14, for any magnetomotive force applied through the winding 2, so that a residual galvanometer deflection obtains which represents a maximum tolerance, or any part thereof, which is allowable as regards variations of successive test specimens from the standard, thus providing a scale for the classification of such test specimens.

While I have shown and described the best forms of my invention now known to me, as determined by my experiments thus far made, it will be apparent to those skilled in the art that changes may be made in the mode of operation and forms of apparatus disclosed without departing from the spirit of my invention, and that certain features of the invention may sometimes be used without a corresponding use of other features.

What I claim is:

1. A method of magnetic testing which consists in subjecting two dissimilar coils to the action of a changing magnetic field, differentially connecting said coils, shunting one of said coils with a resistance, adjusting said resistance until the induced differential electromotive force is zero, placing a specimen of material in the other of said coils, measuring the resultant differential electromotive force and also measuring the electromotive force induced in the first mentioned coil when the shunting resistance is disconnected.

2. A method of magnetic testing which consists in subjecting two dissimilar adjacent coils to the action of a changing magnetic field, differentially connecting said coils, shunting one of said coils with a resistance, adjusting said resistance until the differential induced electromotive force is zero, placing a specimen of material in the other of said coils, measuring the resultant differential electromotive force and also measuring the electromotive force induced in the first mentioned coil when the shunting resistance is disconnected.

3. A method of magnetic testing which consists in subjecting two dissimilar coils to the action of a changing magnetic field, differentially connecting said coils, shunting one of said coils with a resistance, placing standard specimens of material of like magnetic characteristics in each of said coils, adjusting said resistance until the induced differential electromotive force is zero, replacing one of said standard specimens with a specimen of unknown magnetic characteristics and determining the flux characteristics of said unknown specimen relative to said standard specimen.

4. A method of magnetic testing which consists in subjecting two dissimilar coils to the action of a changing magnetic field, differentially connecting said coils, shunting one of said coils with a resistance, placing a standard specimen of material in each of said coils, said standard specimens being alike as to magnetic characteristics, adjusting said resistance until a predetermined value of resultant induced electromotive force is indicated, replacing one of said standard specimens with a specimen of unknown magnetic characteristics and determining the flux characteristics of said unknown specimen relative to said standard specimen.

5. In a method of measuring the intrinsic induction of a specimen of magnetic material, the steps which include variably magnetizing said specimen, shunting a test coil placed in an air path adjacent to said specimen and measuring the differential of the electromotive forces induced in said test coil and in a test coil encircling said specimen.

6. Apparatus for magnetic testing, comprising means for subjecting a test body to the effects of a changing magnetomotive force, a coil encircling said test body, a second coil positioned adjacent to said test body, said second coil being dissimilar to said first coil, means including a shunt across the terminals of said second coil for measuring the intrinsic flux characteristics of the test body and means for measuring the flux adjacent to said test body.

7. Apparatus for magnetic testing, comprising means for subjecting a test body to the effects of a changing magnetomotive force, a coil encircling said test body, a second coil positioned away from said test body, said second coil being dissimilar in area-turns to said first coil; means including an adjustable shunt connected across the terminals of said second coil for measuring the intrinsic flux characteristics of the test body and means for measuring the magnetizing force acting upon said test body.

8. Apparatus for magnetic testing, comprising means for subjecting a test body to the effects of a changing magnetomotive force, a coil encircling said test body, a second coil positioned away from said test body, said second coil being dissimilar in area-turns to said first coil and having its ends affixed to magnetic pole pieces in contact with said test body; means including a resistance connected across the terminals of said second coil for measuring the intrinsic flux characteristics of said test body and means for measuring the magnetizing force acting upon said test body.

9. In a permeameter of the differential type, in combination, means for subjecting a test body to the action of a magnetomotive force, a test coil encircling said test body, a second test coil positioned adjacent to said test body, means including a shunt connected across the terminals of the said second coil for equalizing the effective area-turns of said test coils and means for measuring the differential of the magnetic fluxes linking with said test coils.

10. In combination, a galvanometer system, test coils associated therewith, means including a resistance connected across the terminals of one of said test coils for producing an electromotive force characteristic of the intrinsic induction of a specimen of material and means for measuring the magnetizing force acting upon said specimen.

11. In a device of the class described, in combination, a magnetizing coil provided with a U-shaped magnetic yoke, means comprising extension pieces of magnetic material for lengthening the ends of said yoke, pole pieces of magnetic material in contact with said extension pieces, a test coil spanning said extension pieces, a second test coil spanning said pole pieces and means for equalizing the electromotive forces developed in said test coils.

12. In a device of the class described, in combination, a magnetizing coil provided with a core of magnetic material, magnetic pole pieces provided with means for clamping the end contact portions of a test body between said pole pieces and the end portions of said core, a coil encircling said test body, a second coil having its ends affixed to said pole pieces, means including an adjustable resistance connected across the terminals of said second coil for measuring the intrinsic induction of the test body, and means for measuring the magnetizing force acting upon said test body.

13. In a device of the class described, in combination, a magnetizing coil provided with a core of magnetic material, magnetic pole pieces provided with means for clamping the end contact portions of a test body between said pole pieces and the end portions of said core, a coil encircling said test body, a second coil having its ends affixed to said pole pieces, means including a resistance in shunt relation to said second coil for measuring the intrinsic induction of said test body and means for measuring the magnetizing force acting upon said test body.

14. In a device of the class described, in combination, a core energized so as to supply a magnetic flux, means for causing a part of the flux so supplied to pass through a test body and a part to pass through a path exterior to said test body and means for measuring the differential of the flux in said test body and said path.

15. In a device of the class described, in combination, magnetic core means magnetized to supply a magnetic flux, means for securing a test body across the end regions of said core, a coil encircling said test body, a second coil positioned exteriorly to said body, means including an adjustable resistance for equalizing the effective area-turns of said coils and means for measuring the magnetizing force acting on said test body.

16. The combination with a magnetizing yoke of a test specimen bridging said yoke, a test coil encircling said specimen and a shunted test coil exterior to said specimen, said shunted test coil being connected in series opposition to said encircling test coil, means for measuring the differential of the magnetic fluxes linking with said test coils and means for measuring the magnetizing force acting upon said specimen.

17. In a device of the class described, in combination, magnetic core means magnetized to supply a magnetic flux, means for securing a test body across the end regions of said core, a test coil encircling said test body, a second test coil positioned exteriorly to said test body, means including an adjustable shunt for varying the effective area-turns of said second test coil and means for measuring the magnetizing force acting on said test body.

18. In a device of the class described, in combination, means for magnetizing a test body, a test coil encircling said test body, a second test coil positioned exteriorly to said test body, means including an adjustable shunt individual to said second test coil for the purpose of varying its effective area-turns and means for measuring the magnetizing force acting on said test body.

FRANK P. FAHY.